United States Patent
Sachkov et al.

(10) Patent No.: US 11,233,818 B2
(45) Date of Patent: Jan. 25, 2022

(54) METHOD AND SYSTEM OF DECENTRALIZED MALWARE IDENTIFICATION

(71) Applicant: TRUST LTD., Moscow (RU)

(72) Inventors: Ilya Konstantinovich Sachkov, Moscow (RU); Aleksandr Vyacheslavovich Lazarenko, Ekaterinburg (RU)

(73) Assignee: TRUST LTD., Moscow (RU)

( * ) Notice: Subject to any disclaimer, the term of this patent is extended or adjusted under 35 U.S.C. 154(b) by 424 days.

(21) Appl. No.: 16/243,530

(22) Filed: Jan. 9, 2019

(65) Prior Publication Data

US 2019/0222586 A1    Jul. 18, 2019

(51) Int. Cl.
*H04L 29/06* (2006.01)
*G06N 20/00* (2019.01)

(52) U.S. Cl.
CPC ........... *H04L 63/145* (2013.01); *G06N 20/00* (2019.01); *H04L 63/1416* (2013.01)

(58) Field of Classification Search
None
See application file for complete search history.

(56) References Cited

U.S. PATENT DOCUMENTS

| | | | |
|---|---|---|---|
| 7,225,343 | B1 | 5/2007 | Honig et al. |
| 7,496,628 | B2 | 2/2009 | Arnold et al. |

(Continued)

FOREIGN PATENT DOCUMENTS

| | | |
|---|---|---|
| CN | 103491205 A | 1/2014 |
| CN | 104504307 A | 4/2015 |

(Continued)

OTHER PUBLICATIONS

Ramachandran, Krishna; Sikdar, Biplab. Modeling malware propagation in Gnutella type peer-to-peer networks. Proceedings 20th IEEE International Parallel & Distributed Processing Symposium. https://ieeexplore.ieee.org/stamp/stamp.jsp?tp=&arnumber=1639704 (Year: 2006).*

(Continued)

*Primary Examiner* — Jeremiah L Lavery
(74) *Attorney, Agent, or Firm* — BCF LLP

(57) ABSTRACT

Non-limiting embodiments of the present technology are directed to a system and a method for ensuring cybersecurity, namely, to a method for distributed malware inspection and a system implementing the method. The method comprises receiving input data identifying a potential malware; checking the potential malware based on the input data; adding check parameters and at least one result of the potential malware check into the transaction pool; receiving results of the distributed check of the potential malware from the plurality of networked computer devices; determining a harmfulness parameter based on results of the distributed malware check of the potential malware; in response to the harmfulness parameter of the potential malware exceeds a predetermined threshold value, identifying the potential malware as malware; storing the identified malware and associated data related to the identified malware in the distributed malware register.

18 Claims, 2 Drawing Sheets

(56) References Cited

U.S. PATENT DOCUMENTS

| | | | |
|---|---|---|---|
| 7,620,992 B2 * | 11/2009 | Monastyrsky | G06F 21/566 726/22 |
| 7,712,136 B2 | 5/2010 | Sprosts et al. | |
| 7,730,040 B2 | 6/2010 | Reasor et al. | |
| 7,865,953 B1 | 1/2011 | Hsieh et al. | |
| 7,958,555 B1 | 6/2011 | Chen et al. | |
| 7,984,500 B1 | 7/2011 | Khanna et al. | |
| 8,117,657 B1 * | 2/2012 | Elrod | H04L 63/1466 726/23 |
| 8,132,250 B2 | 3/2012 | Judge et al. | |
| 8,151,341 B1 | 4/2012 | Gudov | |
| 8,255,532 B2 | 8/2012 | Smith-Mickelson et al. | |
| 8,260,914 B1 | 9/2012 | Ranjan | |
| 8,285,830 B1 | 10/2012 | Stout et al. | |
| 8,402,543 B1 | 3/2013 | Ranjan et al. | |
| 8,448,245 B2 | 5/2013 | Banerjee et al. | |
| 8,532,382 B1 | 9/2013 | Ioffe | |
| 8,539,582 B1 | 9/2013 | Aziz et al. | |
| 8,555,388 B1 | 10/2013 | Wang et al. | |
| 8,561,177 B1 | 10/2013 | Aziz et al. | |
| 8,600,993 B1 | 12/2013 | Gupta et al. | |
| 8,612,463 B2 | 12/2013 | Brdiczka et al. | |
| 8,625,033 B1 | 1/2014 | Marwood et al. | |
| 8,635,696 B1 | 1/2014 | Aziz | |
| 8,650,080 B2 | 2/2014 | O'Connell et al. | |
| 8,660,296 B1 | 2/2014 | Ioffe | |
| 8,677,472 B1 | 3/2014 | Dotan et al. | |
| 8,719,924 B1 * | 5/2014 | Williamson | G06F 21/568 726/22 |
| 8,776,229 B1 | 7/2014 | Aziz | |
| 8,850,571 B2 | 9/2014 | Stanford et al. | |
| 8,856,937 B1 | 10/2014 | Wüest et al. | |
| 8,972,412 B1 | 3/2015 | Christian et al. | |
| 8,984,640 B1 | 3/2015 | Emigh et al. | |
| 9,026,840 B1 | 5/2015 | Kim | |
| 9,060,018 B1 | 6/2015 | Yu et al. | |
| 9,210,111 B2 | 12/2015 | Chasin et al. | |
| 9,215,239 B1 * | 12/2015 | Wang | G06F 21/566 |
| 9,253,208 B1 | 2/2016 | Koshelev | |
| 9,330,258 B1 | 5/2016 | Satish et al. | |
| 9,338,181 B1 | 5/2016 | Burns et al. | |
| 9,357,469 B2 | 5/2016 | Smith et al. | |
| 9,456,000 B1 | 9/2016 | Spiro et al. | |
| 9,654,593 B2 | 5/2017 | Garg et al. | |
| 9,723,344 B1 | 8/2017 | Granström et al. | |
| 9,736,178 B1 | 8/2017 | Ashley | |
| 9,917,852 B1 | 3/2018 | Xu et al. | |
| 9,934,376 B1 | 4/2018 | Ismael | |
| 10,176,428 B2 * | 1/2019 | Sridhara | H04L 63/14 |
| 10,567,156 B2 * | 2/2020 | Castinado | H04L 9/0618 |
| 2002/0161862 A1 | 10/2002 | Horvitz | |
| 2003/0009696 A1 | 1/2003 | Bunker et al. | |
| 2006/0074858 A1 | 4/2006 | Etzold et al. | |
| 2006/0107321 A1 | 5/2006 | Tzadikario | |
| 2006/0224898 A1 | 10/2006 | Ahmed | |
| 2006/0253582 A1 | 11/2006 | Dixon et al. | |
| 2007/0019543 A1 | 1/2007 | Wei et al. | |
| 2007/0239999 A1 | 10/2007 | Honig et al. | |
| 2009/0138342 A1 | 5/2009 | Otto et al. | |
| 2009/0281852 A1 | 11/2009 | Abhari et al. | |
| 2009/0292925 A1 | 11/2009 | Meisel | |
| 2010/0011124 A1 | 1/2010 | Wei et al. | |
| 2010/0037314 A1 | 2/2010 | Perdisci et al. | |
| 2010/0076857 A1 | 3/2010 | Deo et al. | |
| 2010/0115620 A1 | 5/2010 | Alme | |
| 2010/0115621 A1 | 5/2010 | Stanford et al. | |
| 2010/0191737 A1 | 7/2010 | Friedman et al. | |
| 2010/0205665 A1 | 8/2010 | Komili et al. | |
| 2010/0235918 A1 | 9/2010 | Mizrahi et al. | |
| 2011/0222787 A1 | 9/2011 | Thiemert et al. | |
| 2012/0030293 A1 | 2/2012 | Bobotek | |
| 2012/0079596 A1 | 3/2012 | Thomas et al. | |
| 2012/0087583 A1 | 4/2012 | Yang et al. | |
| 2012/0158626 A1 | 6/2012 | Zhu et al. | |
| 2012/0233656 A1 | 9/2012 | Rieschick et al. | |
| 2012/0291125 A1 | 11/2012 | Maria | |
| 2013/0086677 A1 | 4/2013 | Ma et al. | |
| 2013/0103666 A1 | 4/2013 | Sandberg et al. | |
| 2013/0111591 A1 | 5/2013 | Topan et al. | |
| 2013/0117848 A1 | 5/2013 | Golshan et al. | |
| 2013/0191364 A1 | 7/2013 | Kamel et al. | |
| 2013/0247192 A1 * | 9/2013 | Krasser | H04L 63/1425 726/23 |
| 2013/0263264 A1 | 10/2013 | Klein et al. | |
| 2013/0297619 A1 | 11/2013 | Chandrasekaran et al. | |
| 2013/0340080 A1 | 12/2013 | Gostev et al. | |
| 2014/0033307 A1 | 1/2014 | Schmidtler | |
| 2014/0058854 A1 | 2/2014 | Ranganath et al. | |
| 2014/0082730 A1 | 3/2014 | Vashist et al. | |
| 2014/0173287 A1 | 6/2014 | Mizunuma | |
| 2014/0310811 A1 | 10/2014 | Hentunen | |
| 2015/0007250 A1 | 1/2015 | Dicato, Jr. et al. | |
| 2015/0049547 A1 | 2/2015 | Kim | |
| 2015/0067839 A1 | 3/2015 | Wardman et al. | |
| 2015/0163242 A1 | 6/2015 | Laidlaw et al. | |
| 2015/0170312 A1 | 6/2015 | Mehta et al. | |
| 2015/0200963 A1 | 7/2015 | Geng et al. | |
| 2015/0220735 A1 | 8/2015 | Paithane et al. | |
| 2015/0295945 A1 | 10/2015 | Canzanese et al. | |
| 2015/0363791 A1 | 12/2015 | Raz et al. | |
| 2015/0381654 A1 | 12/2015 | Wang et al. | |
| 2016/0029221 A1 * | 1/2016 | Suarez Garcia | G06F 21/577 455/410 |
| 2016/0036837 A1 | 2/2016 | Jain et al. | |
| 2016/0036838 A1 | 2/2016 | Jain et al. | |
| 2016/0044054 A1 | 2/2016 | Stiansen et al. | |
| 2016/0055490 A1 | 2/2016 | Keren et al. | |
| 2016/0065595 A1 | 3/2016 | Kim et al. | |
| 2016/0112445 A1 | 4/2016 | Abramowitz | |
| 2016/0127907 A1 | 5/2016 | Baxley et al. | |
| 2016/0149943 A1 | 5/2016 | Kaloroumakis et al. | |
| 2016/0191243 A1 | 6/2016 | Manning | |
| 2016/0205122 A1 | 7/2016 | Bassett | |
| 2016/0205123 A1 | 7/2016 | Almurayh et al. | |
| 2016/0226894 A1 | 8/2016 | Lee et al. | |
| 2016/0253679 A1 | 9/2016 | Venkatraman et al. | |
| 2016/0261628 A1 | 9/2016 | Doron et al. | |
| 2016/0267179 A1 | 9/2016 | Mei et al. | |
| 2016/0285907 A1 | 9/2016 | Nguyen et al. | |
| 2016/0306974 A1 | 10/2016 | Turgeman et al. | |
| 2016/0359679 A1 | 12/2016 | Parandehgheibi et al. | |
| 2017/0034211 A1 | 2/2017 | Buergi et al. | |
| 2017/0111377 A1 | 4/2017 | Park et al. | |
| 2017/0134401 A1 | 5/2017 | Medvedovsky et al. | |
| 2017/0142144 A1 | 5/2017 | Weinberger et al. | |
| 2017/0149813 A1 | 5/2017 | Wright et al. | |
| 2017/0200457 A1 | 7/2017 | Chai et al. | |
| 2017/0230401 A1 | 8/2017 | Ahmed et al. | |
| 2017/0232300 A1 * | 8/2017 | Tran | H04L 67/10 434/247 |
| 2017/0244735 A1 | 8/2017 | Visbal et al. | |
| 2017/0250972 A1 | 8/2017 | Ronda et al. | |
| 2017/0272471 A1 | 9/2017 | Veeramachaneni et al. | |
| 2017/0279818 A1 | 9/2017 | Milazzo et al. | |
| 2017/0286544 A1 | 10/2017 | Hunt et al. | |
| 2017/0289187 A1 | 10/2017 | Noel et al. | |
| 2017/0295157 A1 | 10/2017 | Ohavez et al. | |
| 2017/0295187 A1 | 10/2017 | Havelka et al. | |
| 2017/0324738 A1 | 11/2017 | Hari et al. | |
| 2017/0346839 A1 | 11/2017 | Peppe et al. | |
| 2018/0012021 A1 | 1/2018 | Volkov | |
| 2018/0012144 A1 | 1/2018 | Ding et al. | |
| 2018/0034779 A1 | 2/2018 | Ahuja et al. | |
| 2018/0063190 A1 | 3/2018 | Wright et al. | |
| 2018/0096153 A1 | 4/2018 | Dewitte et al. | |
| 2018/0115573 A1 | 4/2018 | Kuo et al. | |
| 2018/0268464 A1 | 9/2018 | Li | |
| 2018/0307832 A1 | 10/2018 | Ijiro et al. | |
| 2018/0309787 A1 | 10/2018 | Evron et al. | |
| 2019/0089737 A1 | 3/2019 | Shayevitz et al. | |
| 2019/0089740 A1 * | 3/2019 | Hastings | H04L 63/0245 |
| 2019/0207973 A1 | 7/2019 | Peng | |

(56) References Cited

U.S. PATENT DOCUMENTS

| | | |
|---|---|---|
| 2019/0373005 A1 | 12/2019 | Bassett |
| 2020/0134702 A1 | 4/2020 | Li |

FOREIGN PATENT DOCUMENTS

| | | |
|---|---|---|
| CN | 105429956 A | 3/2016 |
| CN | 105897714 A | 8/2016 |
| CN | 106131016 A | 11/2016 |
| CN | 106506435 A | 3/2017 |
| CN | 106713312 A | 5/2017 |
| CN | 107392456 A | 11/2017 |
| EP | 1160646 A2 | 12/2001 |
| EP | 2410452 B1 | 1/2016 |
| GB | 2493514 A | 2/2013 |
| KR | 10-2007-0049514 A | 5/2007 |
| KR | 10-1514984 B1 | 4/2015 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2636702 C1 | 11/2017 |
| RU | 2670906 C9 | 12/2018 |
| RU | 2681699 C1 | 3/2019 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2019/010182 A1 | 1/2019 |

OTHER PUBLICATIONS

Overill, Richard E; Silomon, Jantje A M. A Complexity Based Forensic Analysis of the Trojan Horse Defence. 2011 Sixth International Conference on Availability, Reliability and Security. https://ieeexplore.ieee.org/stamp/stamp.jsp?tp=&arnumber=6046034&tag=1 (Year: 2011).*

Shin, Junghwa et al. A Reputation Management Scheme Improving the Trustworthiness of P2P Networks. 2008 International Conference on Convergence and Hybrid Information Technology. https://ieeexplore.ieee.org/stamp/stamp.jsp?tp=&arnumber=4622806 (Year: 2008).*

Al-Aaridhi, Read et al. Secure model for distributed data structures on distributed hash tables. 2017 IEEE Jordan Conference on Applied Electrical Engineering and Computing Technologies (AEECT). https://ieeexplore.ieee.org/stamp/stamp.jsp?tp=&arnumber=8257771 (Year: 2017).*

Antonatos, Spiros; Hieu, Vu Quang. Harnessing the Power of P2P Systems for Fast Attack Signature Validation. 2009 Third International Conference on Network and System Security. https://ieeexplore.ieee.org/stamp/stamp.jsp?tp=&arnumber=5318955 (Year: 2009).*

Tosh, Deepak K. et al. Consensus protocols for blockchain-based data provenance: Challenges and opportunities. 2017 IEEE 8th Annual Ubiquitous Computing, Electronics and Mobile Communication Conference (UEMCON). https://ieeexplore.ieee.org/stamp/stamp.jsp?tp=&arnumber=8249088 (Year: 2017).*

Abdullah, Nazri et al. Blockchain based approach to enhance big data authentication in distributed environment. 2017 Ninth International Conference on Ubiquitous and Future Networks (ICUFN). https://ieeexplore.ieee.org/stamp/stamp.jsp?tp=&arnumber=7993927 (Year: 2017).*

English Translation of CN106713312, © Questel—FAMPAT, Jul. 17, 2019.

English Translation of CN105897714, © Questel—FAMPAT, Jul. 17, 2019.

English Translation of CN106506435, © Questel—FAMPAT, Jul. 26, 2019.

English Translation of CN107392456, © Questel—FAMPAT, Jul. 29, 2019.

English Translation of CN103491205, © Questel—FAMPAT, Jul. 29, 2019.

English Translation of CN106131016, © Questel—FAMPAT, Jul. 17, 2019.

Invitation to Respond to Written Opinion received Aug. 5, 2019 with regard to the counterpart SG Patent Application No. 10201900339Q.

Invitation to Respond to Written Opinion received Aug. 5, 2019 with regard to the counterpart SG Patent Application No. 10201901079U.

Invitation to Respond to Written Opinion received Jul. 31, 2019 with regard to the counterpart SG Patent Application No. 10201900335P.

Office Action with regard to the counterpart U.S. Appl. No. 16/261,854 dated Oct. 21, 2019.

Search Report with regard to the counterpart RU Patent Application No. 2018144708 completed Aug. 16, 2019.

Search Report with regard to the counterpart RU Patent Application No. 2018147431 completed Aug. 15, 2019.

English Translation of KR10-2007-0049514 (Description, Claims) retrieved on Espacenet on Oct. 15, 2019.

English Abstract of KR10-1514984 retrieved on Espacenet on Oct. 15, 2019.

Office Action with regard to the counterpart U.S. Appl. No. 16/270,341 dated May 27, 2020.

English Abstract of RU107616 retrieved on Espacenet on Jul. 3, 2017.

European Search Report with regard to EP17180099 completed on Nov. 28, 2017.

European Search Report with regard to EP17191900 completed on Jan. 11, 2018.

Yoshioka et al., "Sandbox Analysis with Controlled Internet Connection for Observing Temporal Changes of Malware Behavior", https://www.researchgate.net/publication/254198606, 15 pages.

Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, pp. 210-218.

European Search Report with regard to the counterpart EP Patent Application No. EP17210904 completed May 16, 2018.

European Search Report with regard to the counterpart EP Patent Application No. EP17211131 completed Apr. 12, 2018.

Search Report with regard to the counterpart RU Patent Application No. 2018101761 completed Jun. 20, 2018.

International Search Report with regard to the counterpart Patent Application No. PCT/RU2016/000526 dated Jun. 1, 2017.

Search Report with regard to the counterpart RU Patent Application No. 2018101760 completed Jun. 22, 2018.

Search Report with regard to the counterpart RU Patent Application No. 2018101759 completed Sep. 7, 2018.

English Abstract of RU129279 retrieved on Espacenet on Sep. 11, 2017.

English Abstract of RU164629 retrieved on Espacenet on Sep. 11, 2017.

English Abstract of RU2538292 retrieved on Espacenet on Sep. 11, 2017.

(56) References Cited

OTHER PUBLICATIONS

Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
Search Report with regard to the counterpart RU Patent Application No. 2016137336 completed Jun. 6, 2017.
English Abstract of RU2522019 retrieved on Espacenet on Jan. 25, 2019.
Search Report with regard to the counterpart RU Patent Application No. 2017140501 completed Jul. 11, 2018.
Notice of Allowance with regard to the counterpart U.S. Appl. No. 15/858,013 dated Jun. 10, 2020.
Wikipedia, "Blockchain", https://en.wikipedia.org/wiki/Blockchain, pdf document, 18 pages.
Search Report with regard to the counterpart RU Patent Application No. 2018101764 completed Jun. 29, 2018.
Notice of Allowance with regard to the counterpart U.S. Appl. No. 15/707,641 dated Oct. 30, 2019.
Whyte, "DNS-based Detection of Scanning Worms in an Enterprise Network", Aug. 2004, NOSS, pp. 1-17 (Year: 2005)—Notice of Allowance with regard to the counterpart U.S. Appl. No. 15/707,641.
Office Action with regard to the counterpart U.S. Appl. No. 15/858,013 dated Nov. 22, 2019.
Office Action with regard to the counterpart U.S. Appl. No. 15/707,641 dated Apr. 25, 2019.
Notice of Allowance with regard to the counterpart U.S. Appl. No. 15/858,013 dated May 8, 2020.
Office Action received with regard to the counterpart U.S. Appl. No. 15/858,032 dated Apr. 6, 2020.
Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN105429956 retrieved on Espacenet on Jan. 7, 2020.
English Abstract for CN104504307 retrieved on Espacenet on Jan. 7, 2020.

* cited by examiner

METHOD AND SYSTEM OF DECENTRALIZED MALWARE IDENTIFICATION

CROSS-REFERENCE

The present application claims convention priority to Russian Utility Patent Application No. RU 2018101764, filed on Jan. 17, 2018, entitled "METHOD AND SYSTEM OF DECENTRALIZED MALWARE IDENTIFICATION", the entirety of which is incorporated herein by reference.

FIELD

The non-limiting embodiments of this technology are directed to a system and a method for ensuring cybersecurity in general and more specifically, to a method for decentralized malware check and a system implementing same.

BACKGROUND

The term "blockchain" is widely used today to describe technology of decentralized transaction confirmation that uses formation of a sequential chain of blocks. In this case, the transaction is a minimal logically meaningful data processing operation that makes sense and may only be performed as one whole. A transaction block is a special structure to record a group of transactions, such as for use in Bitcoin or similar systems. The transaction is considered as a completed and confirmed one, when its format and encrypted digital signatures have been verified, and when the transaction itself has been combined into a group with several other transactions and written into a special structure—known as a "block". The blocks may be created by members ("miners") of a peer-to-peer network, in which the blockchain technology is implemented. The blockchain network nodes use a consensus protocol that ensures consistency of the network register content and ensures that the distributed registers of the peer-to-peer network nodes are the exact copies of each other.

The block contents may be checked since each block contains information about previous block(s). All blocks are lined up in a chain that contains information about all operations ever performed in the database. Modifying a block causes all subsequent blocks to become invalid. The blocks with unconfirmed or incomplete transactions may also be recognized as invalid ones. A chain containing a certain number of invalid blocks may also be recognized as an invalid chain. Each block contains a header and the associated transactions themselves. The header contains hash values: a header hash, a previous block hash, a transaction hashes and other service information. Hash algorithms (for example, SHA-256) ensure that any change (no matter how small or trivial) in the transaction input data results in a different hash value. The blockchain network decentralization deprives individual members and member groups of the opportunity to control the system.

Usage of the blockchain is known to store and validate domain names (see, for example, U.S. patent application bearing a publication number U.S. 2016/191,243). The disclosed technology allows for protection against errors in the domain name database. In particular, the described technical solution does not allow "contamination" of the DNS cache that stores potentially false information about unauthorized resolvers. This eliminates the danger of redirecting requests of legitimate applications to network hosts exhibiting malicious activity. DNS responses usually do not have a cryptographic signature. In the described technical solution, a DNS extension is proposed that provides support of cryptographic signatures (keys) for authorization in a trusted peer-to-peer network. The signatures of each organization in the DNS are validated through a "chain of trust", including verification of parent and child keys.

U.S. patent application bearing a publication number U.S. 2017/295,157 discloses use of the blockchain technology to identify user devices. When connecting to the network, information about the user device is requested. Such information may be encapsulated in a block of transactions for subsequent identification of the user. The device information may contain the device settings, MAC address, installed applications and services, connected devices, and other identification information.

The blockchain may be used to secure Internet resources (for example, U.S. patent application bearing a publication number U.S. 2017/324,738). In this case, the blockchain may include domain registrars, domain name services, autonomous systems, etc. as peer-to-peer network members. The set Internet security rules may be transmitted through the peer-to-peer network that cannot be individually controlled by a single network member.

U.S. patent application bearing a publication number U.S.2017/279,818 discloses a method to use a distributed register (in particular, the blockchain system) implemented on a computer that implements verification and distribution of virus signatures. These signatures may be used by antivirus engines in computing devices to detect and remove malware. Antivirus specialists (miners) who have access to the distributed register can test new signatures. The distributed register and antivirus applications may be configured to block new signatures until they are checked by some specified minimum number of the miners.

U.S. patent application bearing a publication number U.S.2017/279,818 discloses a method that allows access through a computer system to data related to virus signatures. Each signature corresponds to a signature rating based on the number of the miners who had added and verified the signature. The computer system can determine authenticity of the virus signature based on the signature rating. If the signature is viral indeed, it may be used by a computer system, for example, for virus scanning.

U.S. patent application bearing a publication number U.S.2017/279,818 discloses a distributed database configured to implement blockchain technology. An electronic register copy may be stored and maintained by the computer system. The other copies may be stored and maintained by other computer systems that are nodes of the computer network. A computer system may receive via a network the transactions that are sent by other computer systems and show addition of new virus signatures to the computer network or notify about the results of signature verification by other computer systems in the network.

Checking malware signatures using centralized confirmation of the signature authenticity is known. For example, U.S. Pat. No. 7,730,040 discloses malware detection that based on user feedback. Since such a system uses a centralized malware database, the possibility of its changes remains.

SUMMARY

Non-limiting embodiments of the present technical solution are aimed to improve the accuracy and reliability of identifying malware.

The technical result of the non-limiting embodiments of the present technology is to eliminate at least some of the disadvantages inherent in the prior art technologies.

In accordance with a first broad aspect of the present technology, there is provided a method of executing a distributed malware check, the method executable in a computer device having access to a distributed malware register and a transaction pool that are implemented in a peer-to-peer network, the peer-to-peer network having a plurality of networked computer devices. The method comprises: receiving input data identifying a potential malware; checking the potential malware based on the input data; adding check parameters and at least one result of the potential malware check into the transaction pool; receiving results of the distributed check of the potential malware from the plurality of networked computer devices; determining a harmfulness parameter based on results of the distributed malware check of the potential malware; in response to the harmfulness parameter of the potential malware exceeds a predetermined threshold value, identifying the potential malware as malware; storing the identified malware and associated data related to the identified malware in the distributed malware register.

In some non-limiting implementations of the method, the receiving the input data comprises receiving the input data from at least one sources selected from one of: a computer device in the peer-to-peer network, at least one client device, a pre-populated database, a remote server, and a computer-readable medium.

In some non-limiting implementations of the method, the input data contains at least one pointer of the potential malware.

In some non-limiting implementations of the method, the input data additionally contains at least one of: a malware signature; a malware attribution data.

In some non-limiting implementations of the method, the receiving the input data comprises receiving the input data at least partially in a hashed form.

In some non-limiting implementations of the method, the method further comprises hashing at least a portion of the input data in response to the at least the portion of the input data having been received in a non-hashed form.

In some non-limiting implementations of the method, after receiving the input data, the method further comprises receiving, from at least one additional source accessible to the computer device, additional input data associated with the potential malware.

In some non-limiting implementations of the method, the receiving results of the distributed check of the potential malware is executed in response to a check of the potential malware taking into account the additional input data.

In some non-limiting implementations of the method, receiving results of the distributed check of the potential malware is executed in response to a check of the potential malware using a machine-learning algorithm.

In some non-limiting implementations of the method, the method further comprises updating a training sample of the machine-learning algorithm based on an outcome of the distributed check of the potential malware.

In some non-limiting implementations of the method, the receiving results of the distributed check of the potential malware is executed in response to an automated check.

In some non-limiting implementations of the method, the receiving results of the distributed check of the potential malware is executed in response to a manual check.

In some non-limiting implementations of the method, the method further comprises at least one of: determining harmfulness of the potential malware; validating a signature of the potential malware; determining attribution data associated with the potential malware.

In some non-limiting implementations of the method, the determining the attribute data is based on the data associated with the potential malware, the data having been received from one of: the input data; the distributed malware register; a malicious resource database.

In some non-limiting implementations of the method, the determining the attribute data comprises determining the data on the attribute of a potential malware using the machine-learning algorithm.

In some non-limiting implementations of the method, the storing further comprises: acquiring and storing additional data associated with the potential malware, the acquiring being from at least one additional source, accessible to the computer device.

In some non-limiting implementations of the method, the determining the harmfulness parameter is further based on at least one of: a number of the peer-to-peer network computer devices that downloaded data associated with the potential malware; a reputation of the peer-to-peer network computer devices that downloaded data associated with the potential malware; a number of the peer-to-peer network computer devices that confirmed the result of the check of the potential malware; a reputation of the peer-to-peer network computer devices that confirmed the result of the check of the potential malware.

In some non-limiting implementations of the method, the method further comprises, after the storing, charging tokens to the computer devices of the distributed peer-to-peer network where the check results were obtained, the tokens corresponding to the harmfulness parameter determined based on the results of the distributed check of the potential malware.

In some non-limiting implementations of the method, the method further comprises, after storing the indication of the malware and associated data in at least one malware database accessible to the computer device.

In some non-limiting implementations of the method, the method further comprises, after storing the indication of the malware and associated data into a training set of a machine-learning algorithm.

In according to another broad aspect of the present technology, there is provided a computer device for distributed malware check, the computer device having access to a distributed register and a transaction pool that are implemented as part of a peer-to-peer network, the computer device comprising a communication interface and a processor functionally coupled to the communication interface. The processor is configured to: receive input data identifying a potential malware; check the potential malware based on the input data; add check parameters and at least one result of the potential malware check into the transaction pool; receive results of the distributed check of the potential malware from the plurality of networked computer devices; determine a harmfulness parameter based on results of the distributed malware check of the potential malware; in response to the harmfulness parameter of the potential malware exceeds a predetermined threshold value, identify the potential malware as malware; store the identified malware and associated data related to the identified malware in the distributed malware register.

In some non-limiting implementations of the device, the processor is further configured to receive the input data from at least one of: a computer device in the peer-to-peer network, at least one client device, a pre-formed database, a remote server, and a computer-readable medium.

In some non-limiting implementations of the device, the input data comprises at least one indication of at least one a potential malware.

In some non-limiting implementations of the device, the input data comprises at least one of: a malware signature; a malware attribute data.

In some non-limiting implementations of the device, the receive input data is, at least in part, in a hashed form.

In some non-limiting implementations of the device, the processor is further configured to hash at least a portion of the input data in response to the at least the portion of the input data having been received in a non-hashed form.

In some non-limiting implementations of the device, the processor is further configured to access at least one additional source, and wherein the processor is further configured to acquire additional input data associated with the potential malware from the at least one additional source.

In some non-limiting implementations of the device, the processor is further configured to check the potential malware taking into account the additional input data.

In some non-limiting implementations of the device, the processor is further configured to check the potential malware using a machine-learning algorithm.

In some non-limiting implementations of the device, the processor is further configured to update a training sample of the machine-learning algorithm based on the confirmed results.

In some non-limiting implementations of the device, the processor is further configured to check the potential malware in an automated way.

In some non-limiting implementations of the device, the processor is further configured to receive results of the check of the potential malware from a human assessor.

In some non-limiting implementations of the device, the processor is further configured to execute one of: determining harmfulness of the potential malware; validating a signature of the potential malware; identifying attribute data of the potential malware.

In some non-limiting implementations of the device, the processor is further configured to determine the attribute data based on the data associated with the potential malware, the data having been acquired from at least from one of: the input data; the distributed malware register; a malicious resource database.

In some non-limiting implementations of the device, the processor is further configured to determine the attribute data using a model based on neural networks.

In some non-limiting implementations of the device, the processor is further configured to add into the transaction pool the additional data.

In some non-limiting implementations of the device, the processor is further configured to determine the harmfulness parameter based on at least one of: a number of the peer-to-peer network computer devices that downloaded data associated with the potential malware; a reputation of the peer-to-peer network computer devices that downloaded data associated with the potential malware; a number of the peer-to-peer network computer devices that confirmed the result of the check of the potential malware; a reputation of the peer-to-peer network computer devices that confirmed the result of the check of the potential malware.

In some non-limiting implementations of the device, the processor is further configured to store the malware and the associated data related to the malware into at least one malware database accessible to the computer device.

In some non-limiting implementations of the device, the processor is further configured to store the malware and the associated data related to the malware into the learning set of the machine-learning algorithm.

In the context of this description, unless otherwise is specifically stated, the words "first", "second", "third", etc. are used as adjectives solely to distinguish nouns to which they refer from each other, but not for the purpose to describe any particular relationship between these nouns.

In the context of this description, unless otherwise is specifically stated, a "malware" is any software designed to gain unauthorized access to computing resources or information for the purpose of illegally using resources or causing harm (damage) to the information owner or network by copying, distorting, deleting or substituting information.

In the context of this description, unless otherwise is specifically stated, a "potential malware" is any software that has been selected to be checked in order to confirm its harmfulness due to it being malicious (i.e. for it actually being malware). Broadly speaking, any software that has not been checked and ruled out as not malware, may be considered as the potential malware.

In the context of this description, unless otherwise is specifically stated, a "peer-to-peer network node" is a software that is implemented on a computer device, is connected to other peer-to-peer network nodes and is configured to perform the operations described below.

In the context of this description, unless otherwise is specifically stated, a "transaction pool" is a distributed database containing transactions formed in one of peer-to-peer network nodes that is used to implement a distributed register, which transactions have not yet been confirmed by other peer-to-peer network nodes.

In the context of this description, unless otherwise is specifically stated, an "indication" of a file may be an information element itself or any other type of a pointer, reference, link or other indirect way that allows a recipient of the indication of the file to locate a network, memory, database or other computer-readable medium from which the information element can be retrieved. For example, an indication of a malware file may contain a universal resource locator (for example, the URL "www.xyz.com/worm.exe", which is used as an example only) identifying the malicious file accessible on a particular network (such as but is not so limited, the Internet). The indication of the file can be implemented in any other suitable way, to indicate to the recipient a network folder, a memory address, a database table or another location a given malicious file, its individual fragments or its signature can be accessed. As will be understood by those skilled in the art, the degree of accuracy required for such the indication depends on the degree of primary understanding the way to interpret the information exchanged by a receiver and a sender of such the indication of the file. For example, if, before data transfer between the sender and the recipient, it is clear that the indication of the file takes the form of a universal resource pointer URL, all that is necessary to transfer a given file to the recipient is to transfer the indication of the given video. In this case, there is no need to transfer the given file itself, as the recipient can access the given file using the indication thereof.

In the context of this description, unless otherwise is specifically stated, an "attribute" of a malware is any information (attributes) associated with a person, a system and/or and organization that have developed or uses the malware.

In the context of this description, unless otherwise is specifically stated, a "signature" is a set of rules that identify malicious activity. For example, a malware signature is referred to any signs that uniquely characterize the specified malware. Signatures also include, for example, rules to detect malicious traffic, behavioral rules for "sandboxes", YARA rules, and the like.

In the context of this description, unless otherwise is specifically stated, an "authenticated signature" of a malware is a signature, which has been confirmed, by the peer-to-peer network members, as a signature that uniquely characterizes the malware.

In the context of this description, unless otherwise is specifically stated, a "transaction" is a minimal logically meaningful data processing operation that makes sense and may only be performed as a whole.

In the context of this description, unless otherwise is specifically stated, the expression "deep neural network" is meant to denote a system of programs and data structures created for the approximate modeling of processes in a human brain. The deep neural networks generally include a series of algorithms that can identify the underlying relationships and connections in a data set using a process that mimics the human brain function. Locations and weights of the data set links generally determine the output. Thus, the deep neural network is generally open for all input data or parameters simultaneously, in its entirety, and, therefore, is able to model their interdependence.

In the context of this description, unless otherwise is specifically stated, a "manual check" is a manual or partially automated check, requiring participation of a human assessor (operator).

In the context of this description, a "computer device" is a computer program operating on relevant equipment that is able to receive requests (for example, from client devices) over the network and execute these requests or initiate execution of these requests. The equipment may be one physical computer or one physical computer system, but neither the one nor the other is necessary for this technical solution. In the context of this technical solution, use of the expression "computer device" does not mean that each task (for example, received commands or requests) or any particular task will be received, executed or initiated to be executed by the same "computer device" (i.e. the same software and/or hardware), but it means that any number of software elements or hardware devices may be involved in receiving/transmitting, executing or initiating the execution of any request or consequence of any request related to the client device, and all this software and hardware may be a single computer device or several computer devices, both options are comprised in the expression "at least one computer device".

In the context of this technical description, a "server" is a computer program that is operating on the appropriate hardware and configured to receive requests (for example, from computer devices) over the network and to execute these requests, or to cause these requests to be sent. This hardware may be one physical computer or one physical computer system, but none of them is required as an option, in accordance with this technology. In this context, use of the expression "server" does not mean that each task (for example, instructions received) or any particular task will be received, executed, or will cause execution by the same server (i.e. by the same program and/or hardware), but it means that any number of software elements or hardware devices may be involved in receiving/sending, executing, or may cause execution of any task or request, or of consequences of any task or request; and all this software and hardware may be implemented as one or more servers.

In the context of this description, unless otherwise is specifically stated, a "token" is an object of the blockchain technology, the token being configured to perform cryptographically protected confirmation of rights of a given party in a specific entity (such as content, information, file, property, etc.) or of ability of the specific entity to execute a predetermined function using the token.

In the context of this description, a "machine-readable medium" is a storage medium of any type and nature, including RAM, ROM, disks (CDs, DVDs, floppy disks, hard disks, etc.), USB flash drives, solid-state drives, tape drives, etc.

In the context of this description, a "database" is any structured data set. The specific structure/implementation thereof are not particularly limited. More specifically, the structure, database management software, computer hardware where the data is stored, used or otherwise available to be used is not particularly limited. The database may be located in the same hardware that executes the process to store or use the data stored in the database, or it may be located on a separate hardware, for example, a dedicated server or several servers.

In the context of this description, unless otherwise is specifically stated, by "external database" is a database accessible to a computer device in the peer-to-peer network, through computer devices that are not in the peer-to-peer network.

In the context of this description, unless otherwise is specifically stated, a "result weight" is a numerically expressed degree of accuracy of a result obtained based on at least one action with a malware or with data associated with the malware. For instance, in a non-limiting example, the result weight of determining the software harmfulness may express a probability that the software is malicious, as determined by a check or a plurality of checks. The result weight of the malware signature generation is an indicator characterizing increase in the efficiency of malware detection when using the signature.

Additional and/or alternative characteristics, aspects and advantages of the embodiments of this technical solution will become apparent from the following description, the accompanying drawings, and the appended claims.

BRIEF DESCRIPTION OF THE DRAWINGS

To better understand this technical solution, as well as its other aspects and characteristics, a reference is provided to the following description that should be used in conjunction with the accompanying drawings, where.

DETAILED DESCRIPTION OF THE NON-LIMITING EMBODIMENTS

The following description is presented only to illustrate non-limiting embodiments of the present technology. This description is not intended to delimit the present technology or define its scope.

Some useful examples to modify the described method and the system that determines the related network resources may also be covered by the following description. Its purpose is also solely to help in understanding, but not to determine the scope and boundaries of this technology. These modifications are not an exhaustive list, and those skilled in the art will understand that other modifications are possible. In addition, it should not be interpreted so that where it has not yet been done, i.e. where no modification examples have been provided, no modifications are possible and/or something described here is the only embodiment of this element of the present technology. As it will be clear to a person skilled in the art, this is most likely not the case. In addition, it should be keep in mind that, in some specific cases, the method and system to determine the related network resources are fairly simple embodiments of the present technology, and in such cases they are presented here in order to facilitate understanding. As it will be clear to a person skilled in the art, many embodiments of the present technology will be much more complex.

Figure 1:
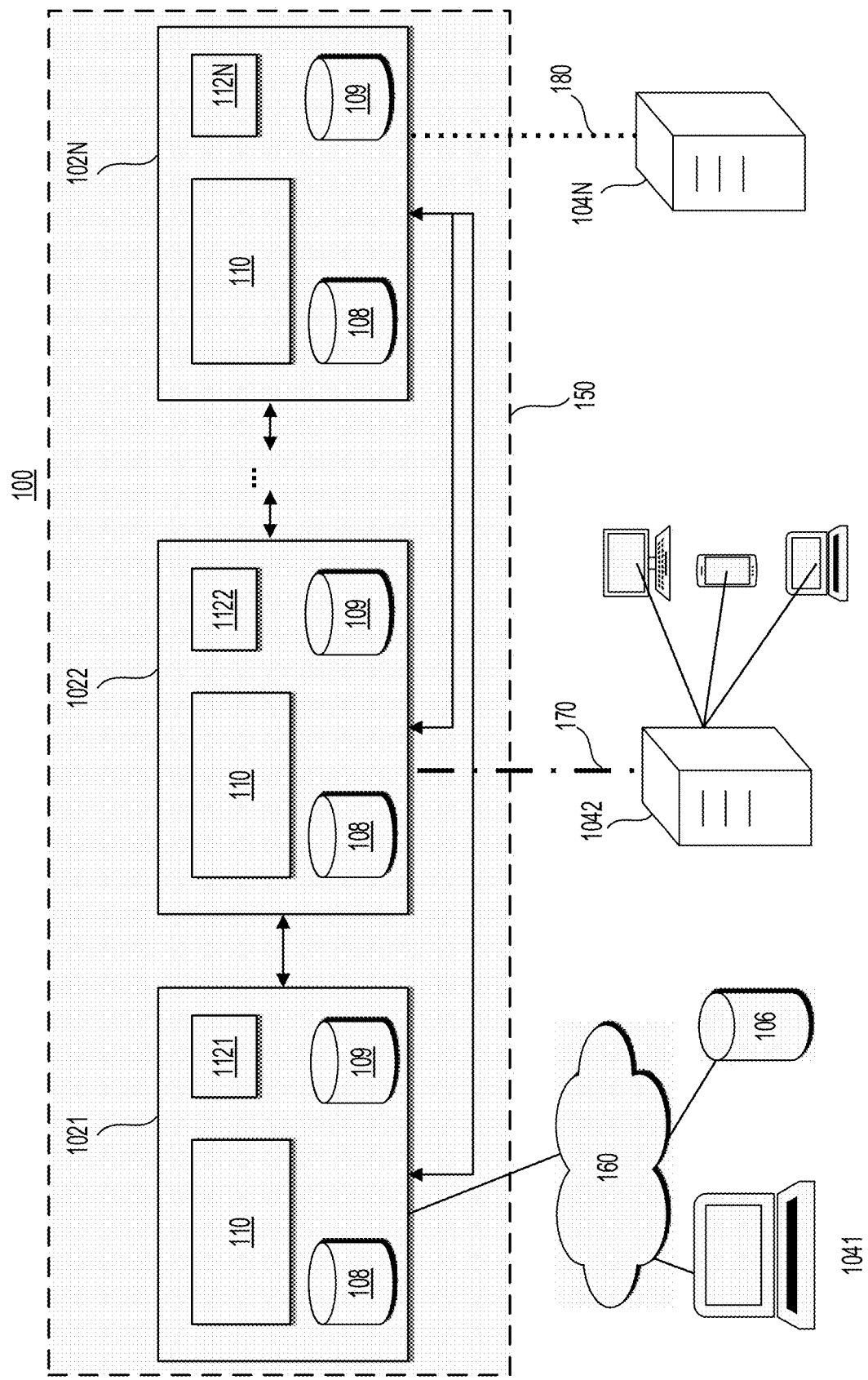
FIG. 1 depicts a system implemented in accordance with the non-limiting embodiments of the present technology.

FIG. 1 shows a schematic representation of one of the non-limiting implementations of a system 100, the system 100 configured to implement the method described herein. In one of the non-limiting embodiment of the present technology, the system 100 comprises a set of computer devices 1021, 1022, . . . , 102N, that are respectively associated with user devices, namely a first user device 1041, a second user device 1042 and a Nth user device 104N. Additionally, the system 100 comprises a database 106 associated with the computer device 1021. Obviously, the system 100 may contain a different number of user devices, databases, and other external sources associated with one or more of the set of computing devices 1021, 1022, . . . , 102N. In at least some non-limiting embodiments of the present technology, no user device may be associated with one or more computer devices from the set of computer devices.

Each of the set of the computer devices 1021, 1022, . . . , 102N is connected to each other (each with each) via a communication channel to form the peer-to-peer network 150. Each of the set of the computer devices 1021, 1022, . . . , 102N is a node of the peer-to-peer network 150 and is configured to receive and transmit messages represented as blocks of transactions in accordance with the blockchain technology.

It should be understood that the number of nodes of the peer-to-peer network 150, namely the number of the computer devices in the set of computer devices 1021, 1022, . . . , 102N is not specifically limited. As an example, but not a limitation, the peer-to-peer network 150 may contain 48, 100, 3000, or any other number of nodes.

In accordance with the non-limiting embodiments of the present technology, each node of the peer-to-peer network 150 may be implemented as a computer device 1021, 1022, . . . , 102N, and each node contains a distributed malware register 108, a transaction pool 109, a machine-learning module 110, and at least one virtual machine 1121, 1122, . . . 112N to execute files containing potential malware in a virtual environment.

The computer devices 1021, 1022, . . . , 102N may be implemented, for example, as a Dell™ PowerEdge™ computer server with an Ubuntu Server operating system. As a non-limiting example of implementation, the computer device 1021 may have the following characteristics: the disk memory of 2TB, 4 or more CPUs for parallel operation of one or several virtual machines, RAM of 256 GB or more, and at least one graphics processor to implement the machine-learning module 110. The computer devices 1022, . . . , 102N may be implemented in a similar way. It is obvious that the computer devices 1021, 1022, . . . , 102N may have the same or different configuration.

As has been alluded to above and in order to enable implementation of the blockchain technology in the peer-to-peer network 150, each node comprises the same distributed malware register 108, the same transaction pool 109, and the same machine-learning module 110. It is noted that the virtual machines 1121, 1122, . . . 112N may be the same or may be implemented differently in different nodes of the peer-to-peer network 150.

Moreover, all or some of the nodes may contain several identical and/or different virtual machine images. As an example, but not a limitation, one of the virtual machines may be implemented with the following specified set of configuration attributes: Windows XP operating system, having x86 (32-bit) architecture, with Russian language (rus), in order to run 32-bit potential malware in it. To run 64-bit potential malware, for example, a virtual machine may be used with the following set of attributes: Ubuntu operating system, x64 (64-bit) architecture, English language (eng).

The distributed malware register 108 may be a database hosted on associated physical equipment that may be one or more computer-readable media. The distributed malware register 108 of one or several nodes of the peer-to-peer network 150 may additionally be accessible (read-only, as an example) to one or several external devices. For example, according to a non-limiting embodiment of the system 100, the distributed malware register 108 hosted on the computer device 1021 may be accessible by the first user device 1041 and by the database 106 of computer malware, the distributed malware register 108 hosted on the computer device 1022 may be accessible to the second user device 1042, the distributed malware register 108 hosted on the computer device 102N may be accessible to the user device 104N.

The transaction pool 109 may be implemented as a database hosted on associated physical equipment that may be one or more computer-readable media. In one embodiment, the transaction pool 109 and the distributed malware register 108 of some nodes may be implemented using the same physical hardware. It should be noted that, in general, only the nodes of the peer-to-peer network 150 have access to the transaction pool 109. Information inputted by the node of the peer-to-peer network 150 to the transaction pool 109 becomes available to all nodes of the peer-to-peer network 150.

In one of the non-limiting implementations of the present technology, the peer-to-peer network 150 is configured to transfer transaction blocks in accordance with the blockchain technology, the transactions reflecting information about at least one of the following: signatures of malware/potential malware, hash sums of malware/potential malware files, indications of malware/potential malware files, results of automated check of malware/potential malware and parameters of the algorithms used in this method, results of manual check of malware/potential malware for each node of the peer-to-peer network, the total check result determined on the basis of results of check of malware/potential malware by computer devices, reputation of the nodes that execute the automated check, reputation of the nodes that execute the manual check, generation parameters.

In one of the non-limiting implementations of this technology, in addition to the peer-to-peer network 150, each of the set of the computer devices 1021, 1022, . . . , 102N may additionally be configured to transmit data in other data networks (not shown), in particular, in the Internet, a local or other data network.

The first user device 1041 may be associated with the computer device 1021, for example via a data communication network 160, which may be the Internet, the database 106 may be also accessible to the computer device 1021 via the data communication network 160 or another network (not shown). The first user device 1041 in some non-limiting embodiments of the present technical solution may be a personal computer (desktop, notebook, etc.) where the software may be installed, for example, to identify suspicious potential malware and malicious files and to send them via the data communication network 160 as input data to the computer device 1021 that is the node of the peer-to-peer network 150.

In addition, the first user device 1041 may have access to the distributed malware register 108. If check of potential malware by the set of the nodes of the peer-to-peer network 150 confirms the software harmfulness, then the software, its hash sum, and at least a portion of the associated malware-related data can be input into the distributed malware register 108. Thus, the first user device 1041 may receive data associated with malware confirmed by the set of the nodes of the peer-to-peer network 150. The potential malware or indication thereto may be pre-stored in the database 106. The first user device 1041 may be configured to receive from the database 106 the input data related to the potential malware.

The second user device 1042 may be connected to the computer device 1022, for example, via a local network 170 based on a wired Ethernet network or a wireless network (Wi-Fi, Bluetooth, 3g/4g/LTE, etc.).

The second user device 1042 in some non-limiting embodiments of the present technology may be a server or active network equipment configured to collect data about potential malware from the set of the devices associated with the server (not numbered). At the same time, software may be installed on the second user device 1042 to check traffic from the corporate network devices and to search malicious activity or to collect information from software installed in devices included in, for example, the corporate network.

In one embodiment, the second user device 1042 may contain a device to capture network traffic and acquire data representative of potential malware based on network traffic analysis or may have access to such device. For example, without limitations, the network traffic capture device may be one of the following devices: L2 network switches using network traffic mirroring technology for the required network segments, such as, for example, the network traffic mirroring SPAN technology in Cisco hardware, network transparency tools also referred to as Security Delivery Platforms or Network Packet Brokers (NPB), and Test Access Points of various types, as well as proxy servers with ICAP support working within the established TCP connection, mail servers with SMTP support, etc.

In some non-limiting embodiments of the present technology, the second user device 1042 may send potential malware via the data communication network 180 as input data to the computer device 1022, which is a node of the peer-to-peer network 150.

In addition, the second user device 1042 may have access to the distributed malware register 108. If check of potential malware by the set of the nodes of the peer-to-peer network 150 confirms the software harmfulness, then the software will be input into the distributed malware register 108. Thus, the second user device 1042 may receive data about malware confirmed by the set of the nodes of the peer-to-peer network 150.

The Nth user device 104N may be associated with the computer device 102N, for example, via the data communication network 180 based on a wired Ethernet network or a wireless network (Wi-Fi, Bluetooth, 3g/4g/LTE, etc.)

The Nth user device 104N in some non-limiting embodiments may be a server for searching and analyzing cyber threats, collecting data, in particular, about potential malware and attribution (information (attributes) related to persons, systems and/or organizations that developed or used the specified malware or its part) associated with this potential malware. In some non-limiting embodiments, the Nth user device 104N may send potential malware via the data communication network 180 as input data to the computer device 102 N, which is a node of the peer-to-peer network 150.

The Nth user device 104N may have access to the distributed malware register 108. If check of potential malware by the set of the nodes of the peer-to-peer network 150 confirms the software harmfulness, then the software will be input into the distributed malware register 108. Thus, the Nth user device 104N may receive data about malware confirmed by the set of the nodes of the peer-to-peer network 150.

The Nth user device 104N may be a usual computer server. In the exemplary embodiment of this technical solution, the Nth user device 104N may be a Dell™ PowerEdge™ server that uses the Ubuntu Server operating system. The Nth user device 104N may be any other suitable hardware and/or application software, and/or system software, or their combination. In the present embodiment of the present technical solution, which does not limit its scope, the Nth user device 104N is a single server. In other embodiments of the present technical solution that do not limit its scope, the functionality of the Nth user device 104N may be divided among several user devices and, for example, may be executed by several servers.

It should be noted that each user device 1041, 1042, . . . 104N that has access to the distributed malware register 108 may receive data about any confirmed malware that has been checked by plurality of nodes of the peer-to-peer network 150, regardless of the source of this malware. For example, malware received by the computer device 1021 from the first user device 1041, after confirmation, will be available to the second user device 1042 and other user devices including the Nth user device 104N.

The machine-learning module 110 is configured to use a machine learning algorithm configured to check and confirm harmfulness of a potential malware file. In some embodiments of the present technology, one or more machine learning algorithms may be any suitable machine-learning algorithm trained in a supervised or semi-supervised manner, such as:

Artificial neural network
Gaussian regression process
Decision trees
and so on

In general, the machine-learning module 110 executes one or more machine learning algorithms to analyze potential malware based on results of the launch of potential malware in at least one virtual machine 1121, 1122, . . . 112N.

As will be appreciated by those skilled in the art, other similar embodiments of the system 100 are possible in the scope of the above description of the system 100.

Figure 2:
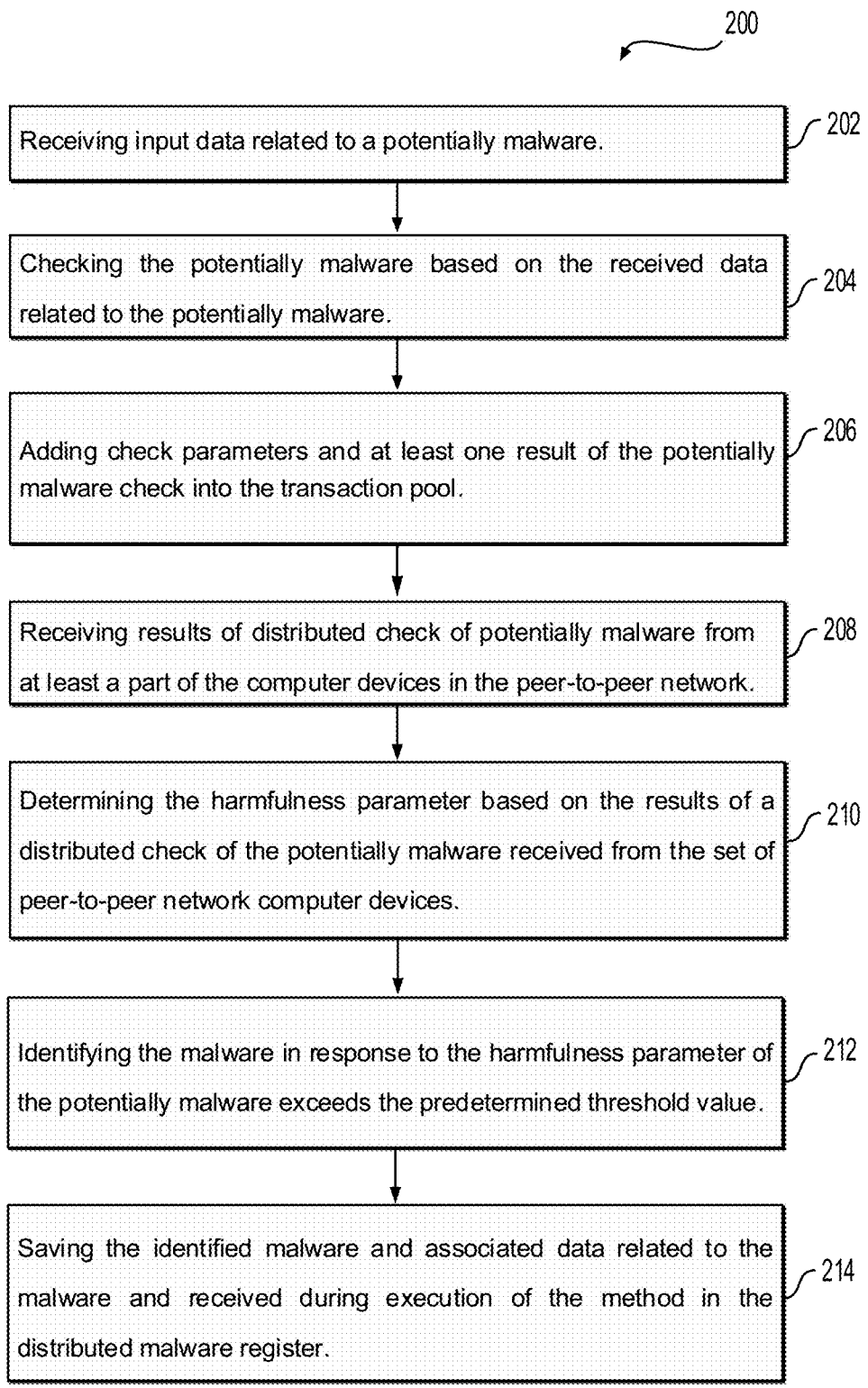
FIG. 2 depicts a flowchart a method implemented in the system of FIG. 1, the method being implemented in accordance with the non-limiting embodiments of the present technology.

A method 200 for distributed (and/or decentralized) malware check will be discussed in more detail, referring to FIG. 2. The method 200 may be executed in any of the set of the computer devices 1021 . . . 102N and, more specifically, by a processor (not shown) of any said computer device in accordance with a non-limiting embodiment of system 100 shown in FIG. 1. For purposes of the present description, we consider an illustrative example where the method 200 is executed in the computer device 1021.

Step 202: Receiving Input Data Associated with a Potential Malware

The method 200 begins at step 202. The computer device 1021 receives input data associated with a potential malware. In the context of this application, the potential malware is any software that, during its execution, is executing or may execute malicious activity, carry out unauthorized access to information, illegally use, copy, distort, delete or substitute information.

The input data may be received from at least one of the following sources: computer devices in the peer-to-peer network 150, at least one client device, a pre-populated database, a remote server, computer-readable media. It should be noted that other information sources associated with at least one computing device 1021 may also be possible within the context of the system 100.

The input data may contain at least one indication of a potential malware file. In one of the non-limiting embodiments of the present technology, the indication of the malware file may contain a universal resource locator (for example, the URL—www.xyz.com) identifying the malicious file on a particular network (such as, the Internet). Naturally, the indication of the malware file can be implemented in any suitable pointer to a network folder, memory address, database table or another place where you can access the malicious file, its individual fragments or signature.

The input data may additionally comprise at least one of the following: the malware signature, the malware attribute data, metadata of the potentially malicious file, information about the files associated with the potentially malicious file. The malware signature is referred to any characteristics that uniquely characterize the given malware. The files associated with the potential malware may be, for example, the files received with the potentially malicious files from the same source and at the same time. The related files may have common features, for example, a part of the file name, a digital signature, etc. The metadata of the potentially malicious file may comprise at least the source from which the file was received, the file size, the date of the last file modification, and other similar information.

The input data may be received at least partially in a hashed form. In response to the fact that at least a portion of the input data has been received in a non-hashed form, at least a portion of the input data may be hashed.

In one of the non-limiting embodiments of the present technology, after receiving the input data, at least a portion of the additional input data related to this malware is extracted from at least one additional source accessible to the computer device 1021 of the peer-to-peer network. In this embodiment, the check of the potential malware is carried out taking into account the additional input data related to this potential malware.

For example, information about the file type (a trojan program) and the file source (the antivirus installed in the user end device) may be obtained from additional sources. In this case, the potential malware will checked, for example, by an algorithm optimized to detect trojan programs. Additionally, for example, the user device hardware and software parameters may be taken into account.

The method 200 then proceeds to step 204.

Step 204: Checking the Potential Malware Based on the Received Data Associated with the Potential Malware At the step 204, the computer device processor checks the potential malware based on the received data associated with the potential malware.

The potential malware check based on the data related to this potential malware may comprise at least one of the following:

determining harmfulness of the potential malware;
determining attribute data of the potential malware.

The harmfulness may be determined with any of the methods known in the prior art. In one of the non-limiting embodiments, the malware is started in the virtual machine 1121. The virtual machine 1121 may be specially adapted to detect malware, in particular, in this virtual machine, user applications may be installed and services are running. The parameters of the virtual machine 1121 used to check the malware may be determined based on at least one of the following: input data related to the potential malware, settings of the malware analysis model, etc. The specified parameters of the virtual machine 1121 may be stored in the transaction pool 109. Thus, the parameters of the virtual machine 1121 used to check the malware by the computer device 1021 might be used to check the malicious file by the other computer devices of the peer-to-peer network 150.

The attribute data of a potential malware may be determined based on the data related to the potential malware and received at least from one of the following sources:

received input data;
distributed malware register;
malicious resource database.

For example, the malware may be a modification of a previously known program, and the specified known program had been previously identified as malicious and had been stored in the database 106.

The attribute data of the potential malware may be determined using the machine-learning module 110 that uses the malware model. For example, the malware model may describe the characteristic features of malware developed by a known hacker group. Building the malware model, for example, cyber intelligence data may be used.

In one of the non-limiting embodiments of the present technology, the potential malware is checked by the processor of the computer device 1021 using a machine-learning algorithm to analyze malware. In this case, the machine-learning module 110 is used. In particular, in some non-limiting embodiments, the machine-learning module can determine the potential malware harmfulness and evaluate results of checks executed by the other peer-to-peer network nodes that have access to the distributed register. The malware analysis model is pre-trained on a sample of the malware-related data.

Additionally, the malware analysis model may be re-trained with an updated sample taking into account the results confirmed by the computer devices 1021 . . . 102N.

The model input data is at least the input data related to the potential malware received by the computer device 1021 of the peer-to-peer network. In one embodiment non-limiting embodiment of the method 200, the potential malware is checked in an automated way. For example, the check may be performed using the machine-learning module 110. At least a part of the automatic algorithm parameters may be set manually. For example, a weight threshold for the check result of the potential malware that is sufficient to store the specified result into the distributed malware register 108 may be set manually.

In another non-limiting embodiment of the method 200, the potential malware can be additionally manually checked. The reason for execution of the manual check may be different or, in some non-limiting embodiments, the manual check can be executed for no any specific reason. For example, hit of the value of the weight of the total check result to a given range of weights may be used as a condition for a manual check. This total check result is a result determined on the basis of the individual check results received from at least a portion of the computer devices 1021 . . . 102N that have executed the check. The check results at least of the portion of the computer devices 1021 . . . 102N of the peer-to-peer network may be stored, for example, in the transaction pool 109. In another non-limiting embodiment of the method 200, a manual check may be executed regardless of the automatic check results.

The method 200 then proceeds to step 206.

Step 206: Adding Check Parameters and at Least One Result of the Potential Malware Check into the Transaction Pool At the step 206, the results and parameters of the malware check executed by the processor of the computer device 1021 are stored in the transaction pool 109 accessible to each of the computer devices 1021 . . . 102N. An example of the check parameters may be, for example, the parameters of the virtual machine 1121. Thus, each computer device from the set of the devices 1022 . . . 102N may check harmfulness of the potentially malicious file using the same check parameters that are the parameters used by the computer device 1021.

In one of the non-limiting embodiments of the method 200, at the step 206, additional data related to the potential malware received from at least one additional source available to the computer device 1021 is also entered into the transaction pool 109. In some non-limiting examples of this embodiment, additional sources of data related to the potential malware may comprise the database 106, an external malware database, etc.

The method 200 proceeds to step 208.

Step 208: Receiving Results of Distributed Check of Potential Malware from at Least a Portion of the Computer Devices in the Peer-to-Peer Network At step 208, the computer device 1021 receives results of distributed check of potential malware from at least a portion of computer devices 1022 . . . 102N. These results may be transmitted via data communication channels available to each of the computer devices 1021 . . . 102N that may transmit these results in a hashed form.

The results of distributed check of potential malware may be stored by each of the computer devices in the peer-to-peer network 150 as blocks in the transaction pool 109 in accordance with the blockchain technology.

The method 200 then proceeds to step 210.

Step 210: Determining the Harmfulness Parameter Based on the Results of a Distributed Check of the Potential Malware Received from the Set of Peer-to-Peer Network Computer Devices At step 212, the processor of the computer device 1021 determines the harmfulness parameter based on the results of the distributed check of potential malware received from at least a portion of the computer devices 1022 . . . 102N.

The harmfulness parameter is a function that depends on the number N of the computer devices 1021 . . . 102N in the peer-to-peer network 150, of reputation of each of these devices and of the results of determination of the harmfulness of the potential malware received by each of the computer devices [1021 . . . 102N]. For example, the harmfulness parameter may be found as follows:

$$\frac{\sum_{i=0}^{N}\left(\begin{array}{c}(\text{device 102}i\text{ reputation})* \\ (\text{device 102}i\text{ result})\end{array}\right)}{\text{number of devices received result}} \quad \text{(Formula 1)}$$

In one of the not-limiting embodiments of the method 200, the harmfulness parameter is determined based on results of distributed check of the potential malware, which are received from a portion of the peer-to-peer network computer devices, and based on at least one of the following parameters:

number of the computer devices from the set of the computer devices 1021 . . . 102N that downloaded data about the potential malware;

reputation of the computer devices from the set of the computer devices 1021 . . . 102N that downloaded the data about the potential malware;

number of the computer devices from the set of the computer devices 1021 . . . 102N that confirmed the result of the check of the potential malware;

reputation of the computer devices from the set of the computer devices 1021 . . . 102N that confirmed the result of the check of the potential malware.

The method 200 then proceeds to step 212.

Step 212: Identifying the Malware in Response to the Harmfulness Parameter of the Potential Malware Exceeds the Predetermined Threshold Value At the step 212, the computer device 1021 processor identifies the malware in response to the harmfulness parameter of the potential malware exceeding a predetermined threshold value.

For example, the harmfulness parameter threshold value may be set to 7. In response to the calculated harmfulness parameter is 8, the corresponding potential malware will be marked as malicious.

The method 200 then proceeds to step 214.

Step 214: Storing the Identified Malware and Associated Data Related to the Malware and Received During Execution of the Method in the Distributed Malware Register At the step 214, the computer device 1021 processor stores the malware in the distributed malware register 108. The method to save this information and the structure of the stored information related to the malware may be configured, for example, in accordance with the blockchain technology. The saved malware information of the computer devices 1021 . . . 102N may be accessed through the peer-to-peer network 150. Each of the computer devices 1021 . . . 102N stores an up-to-date copy of the distributed malware register 108.

In this case, at least one of the following may be considered the identified malware: the malware file, the hash sum of the malware file, the malware signature. Any information related to the malware and confirmed by computer devices of the peer-to-peer network 150, for example, an identifier of the malware file, the malware signature, the files related with the malware, similar malware, the malicious file metadata, the results of check by each of the computer devices of the peer-to-peer network 150, the reputation of the specified computer devices, etc. may be considered as the accompanying data related to the malware obtained during the execution of method 200.

After the step 214, the method 200 may terminate.

In one of the non-limiting embodiments of the method 200, after storing the identified malware in the distributed malware register 108, the processor of the computer device 1021 charges tokens to the computer devices of the distributed peer-to-peer network 150 where the check results were obtained that correspond to the harmfulness parameter determined on the basis of the results of the distributed check of the potential malware that were received from the set of the computer devices in the peer-to-peer network 150.

In one of the non-limiting embodiments of the method 200, after storing the identified malware and associated data related to the malware obtained during execution of the method 200 in the distributed malware register 108, the computer device 1021 processor additionally stores the malware and associated data related to the malware obtained during the execution of the method 200 in at least one malware database accessible to the computer device, for example, in the database 106.

In one of the non-limiting embodiments of the method 200, after storing the identified malware and associated data related to the malware obtained during execution of the method 200 in the distributed malware register 108, the computer device 1021 processor additionally stores the malware and associated data related to the malware obtained during the method execution in the learning set of the machine-learning algorithm used by the machine-learning module 110.

EXAMPLE

A non-limiting example of one of the implementations of the non-limiting embodiments of the present technology is provided below.

In this non-limiting example, the distributed malware check is executed in the node 1021 of the peer-to-peer network.

For example, the following input data may be received: a malicious file with metadata (name, size, extension, creation date, change date, etc.), the web resource URL where the file was found, the data (hardware and software, logs, etc.) of the user device where the file was run, the malware YARA signature. For example, the following YARA signature may be obtained for a given malware:

```
rule silent_banker : banker
{
meta:
description = "This is just an example"
thread_level = 3
in_the_wild = true
strings:
$a = {6A 40 68 00 30 00 00 6A 14 8D 91}
$b = {8D 4D B0 2B C1 83 C0 27 99 6A 4E 59 F7 F9}
$c = "UVODFRYSIHLNWPEJXQZAKCBGMT"
condition:
$a or $b or $c
}
```

The check by an automated way involves running a malicious file in a virtual environment and applying to it a previously trained machine-learning algorithm.

After checking, the following data is written to the transaction pool of the distributed register:
1) File hash sum
2) Result of checking the potential malware for harmfulness by the node 1021 of the peer-to-peer network
3) Malicious indicators including the settings of the virtual machine 1121

After receiving the results of the malware check by other nodes of the peer-to-peer network, the malware parameter is determined. The harmfulness parameter is a function that depends on the number N of the nodes [1021 ... 102N] of the peer-to-peer network, on the rating of each of the nodes, and on the results of determining harmfulness of a potential malware received by each of the nodes.

Based on the harmfulness parameter value, harmfulness of the potential malware is determined, and the malware is identified.

After identifying the malware, the following information is input into the distributed register:
1) An indication of the malicious file
2) Hash sum of the malicious file
3) Results of predictions of each node of the peer-to-peer network with parameters (for example, weights and architecture when training a neural network)
4) Manual check results
5) Overall result obtained using the results of the distributed check as a whole based on scoring
6) Reputation, the number of the peer-to-peer network nodes that performed the check and the check type (automated or manual)
7) Unique malware attributes: description of the malware behavior in an infected system; changes in the system registry made by the malware; malware-generated files.

Further, these data are entered into the external database used to detect malware, for example, the anti-virus company database.

Modifications and improvements to the above described embodiments of this technology will be clear to those skilled in the art. The foregoing description is provided as an example only and is not limited in any way. Thus, the scope of this technology is limited only by the scope of the attached claims.

The invention claimed is:

1. A method of executing a distributed malware check, the method executable by a given computer device of a plurality of computer devices forming a distributed network, the plurality of computer devices being communicatively coupled amongst each other via a peer-to-peer connection, the given computer device of the plurality of computer devices including: (i) a respective individual copy of a distributed malware register database, the distributed malware register database being for storing data of malware identified by each one of the plurality of computer devices of the distributed network; and (ii) a respective individual copy of a transaction pool database, the transaction pool database being for storing parameters of the plurality of computer device, the method comprising:

receiving, by the given computer device, input data identifying a potential malware;

analyzing, by the given computer device, using a given set of check parameters, the input data to determine if the potential malware is malware;

adding, by the given computer device, the input data, the given set of check parameters, and at least one result of the analyzing into the respective individual copy of the transaction pool database, thereby causing replication of the given set of check parameters and the at least one result of the analyzing in respective individual copies of the transaction pool database of other ones of the plurality of computer devices of the distributed network enabling the other ones of the plurality of computer device to analyze the input data of the potential malware using the given set of check parameters;

receiving, by the given computer device, respective results of analyzing, by at least some of the other ones of the plurality of computer devices, the input data to determine if the potential malware is the malware;

aggregating the at least one result of the analyzing the potential malware by the given computer device and the respective results from the at least some of the other ones of the plurality of computer devices of the distributed network to determine a harmfulness parameter associated with the potential malware;

in response to the harmfulness parameter of the potential malware exceeds a predetermined threshold value, identifying, by the given computer device, the potential malware as being the malware;

storing, by the given computer device, data of the identified malware in the respective individual copy of the distributed malware register of the given computer device, thereby causing replication of the data of the identified malware in respective individual copies of the distributed malware register of the other ones of the plurality of computer devices for further use in identifying the malware.

2. The method of claim 1, wherein the receiving the input data comprises receiving the input data from at least one sources selected from one of: one of the plurality of computer devices in the distributed network, at least one client device, a pre-populated database, a remote server, and a computer-readable medium.

3. The method of claim 1, wherein the input data contains at least one pointer of the potential malware.

4. The method of claim 1, wherein the input data additionally contains at least one of:
a malware signature;
a malware attribution data.

5. The method of claim 1, wherein the receiving the input data comprises receiving the input data at least partially in a hashed form.

6. The method of claim 1, wherein the method further comprises hashing at least a portion of the input data in response to the at least the portion of the input data having been received in a non-hashed form.

7. The method of claim 1, wherein after receiving the input data, the method further comprises receiving, from at least one additional source accessible to the given computer device, additional input data associated with the potential malware.

8. The method of claim 7, wherein the analyzing the input data of the potential malware, by the at least some of the other ones of the plurality of computer devices, is executed taking into account the additional input data.

9. The method of claim 1, wherein the given computer device is configured to run an individual machine-learning algorithm trained to determine if a given piece of software is the malware, and the analyzing the input data of the potential malware includes using the machine-learning algorithm.

10. The method of claim 9, wherein the method further comprises updating a training sample of the machine-learning algorithm based on the results of the analyzing the input data by the at least some of the other ones of the plurality of computer devices.

11. The method of claim 1, wherein the analyzing the input data of the potential malware is executed in an automated way.

12. The method of claim 11, wherein the analyzing the input data of the potential malware is executed, at least partially, in a manual way.

13. The method of claim 1, wherein the analyzing the input data to determine if the potential malware is the malware comprises at least one of:

determining harmfulness of the potential malware;
validating a signature of the potential malware;
determining attribution data associated with the potential malware.

14. The method of claim 13, wherein the determining the attribute data is based on the data associated with the potential malware, the data having been received from one of:
the input data;
the distributed malware register;
a malicious resource database communicatively coupled to the distributed network.

15. The method of claim 1, wherein the storing further comprises: acquiring and storing additional data associated with the potential malware, the acquiring being from at least one additional source, accessible to the given computer device.

16. The method of claim 1, wherein determining the harmfulness parameter is based on at least one of:
a number of the at least some of the other ones of the plurality of computer devices that downloaded, from their respective individual copies of the transaction pool database, data associated with the potential malware;
a reputation of each one of the at least some of the other ones of the plurality computer devices that downloaded the data associated with the potential malware;
a number of the at least some of the other ones of the plurality computer devices that confirmed the at least one result rendered by the given computer;
a reputation of the at least some of the other ones of the plurality computer devices that confirmed the at least one result.

17. The method of claim 1, wherein the method further comprises, after the storing, charging tokens to each one of the given computer device and the at least some of the other ones of the plurality of computer devices of the distributed network where the results were obtained, the tokens corresponding to the harmfulness parameter determined based on the results of the analyzing the input data.

18. A computer device for distributed malware check, the computer device being one of a plurality of computer devices forming a distributed network, the plurality of computer devices being communicatively coupled amongst each other via a peer-to-peer connection, the computer device of the plurality computer devices including: (i) a respective individual copy of a distributed malware register database, the distributed malware register database being for storing data of malware identified by each one of the plurality of computer devices of the distributed network; and (ii) a respective individual copy of a transaction pool database, the transaction pool database being for storing parameters of the plurality of computer device, the computer device comprising a communication interface and a processor functionally coupled to the communication interface, the processor being configured to:
receive input data identifying a potential malware;
analyze, using a given set of check parameters, the input data to determine if the potential malware is malware;
add the input data, the given set of check parameters, and at least one result of the analyzing into the respective individual copy of the transaction pool database, thereby causing replication of the given set of check parameters and the at least one result of the analyzing in respective individual copies of the transaction pool database of other ones of the plurality of computer devices of the distributed network enabling the other ones of the plurality of computer device to analyze the input data of the potential malware using the given set of check parameters;

receive respective results of analyzing, by at least some of the other ones of the plurality of computer devices, the input data to determine if the potential malware is the malware;

aggregate the at least one result of the analyzing and the respective results from the at least some of the other ones of the plurality of computer devices of the distributed network to determine a harmfulness parameter associated with the potential malware;

in response to the harmfulness parameter of the potential malware exceeds a predetermined threshold value, identify the potential malware as being the malware;

store data of the identified malware in the respective individual copy of the distributed malware register of the computer device, thereby causing replication of the data of the identified malware in respective individual copies of the distributed malware register of the other ones of the plurality of computer devices for further use in identifying the malware.

\* \* \* \* \*